Feb. 26, 1957 G. D. PERKINS 2,783,438

ARTIFICIAL TRANSMISSION LINE

Filed Feb. 14, 1946

INVENTOR.
GEORGE D. PERKINS

BY M. O. Hayes

ATTORNEY 2,783,438
Patented Feb. 26, 1957

2,783,438

ARTIFICIAL TRANSMISSION LINE

George D. Perkins, Salem, Mass., assignor, by mesne assignments, to the United States of America as represented by the Secretary of the Navy Application February 14, 1946, Serial No. 647,590
6 Claims. (Cl. 333—20)

This invention relates to artificial transmission lines and more particularly to a delay line with discontinuous characteristics for imparting to a selected reflection of an input pulse an amplitude and form substantially equal to that of the input pulse while suppressing other reflections.

Various types of coding and counting circuits depend upon the addition of a series of timed recurrent pulses to achieve an amplitude sufficient to trigger associated circuits. One means of providing for the addition of consecutive pulses is an artificial delay line, short circuited at its far end, which returns a first input pulse to its input end at the proper time and of the proper polarity to reinforce the next desired pulse. However, the delay line will present other reflections which may be undesirable.

The present invention provides a delay line with discontinuous characteristics which causes a predetermined reflection to reinforce a subsequent pulse and which suppresses other undesired reflections.

An object of this invention is to provide a delay line for delaying an input pulse and reflecting the pulse to its input end with proper polarity and at a proper time to reinforce a subsequent input pulse and for suppressing other undesired reflections.

Another object is to provide a coding circuit for adding two pulses having a predetermined time spacing for achieving an amplitude sufficient to trigger associated circuits.

These and other objects and features of this invention will become apparent upon consideration of the following detailed description when taken together with the accompanying drawings, where—

Figure 1:
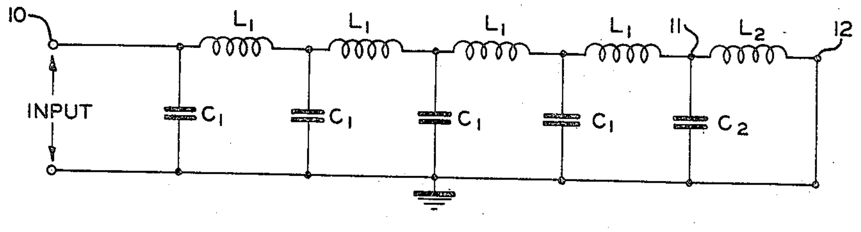
Figure 2:
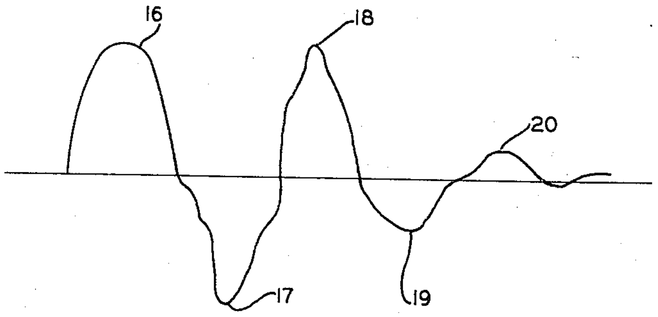

Fig. 1 is a schematic diagram of an artificial transmission line embodying this invention; and Fig. 2 illustrates the actual waveform observed at the input end of the line of Fig. 1 for a single input pulse.

In Fig. 1, the artificial transmission line comprises four L sections of line, of inductance $L_1$ and capacitance $C_1$ per section, connected in series between input terminal 10 and terminal 11, and a fifth L section of inductance $L_2$ and capacitance $C_2$ connected between terminal 11 and terminal 12 at the end of the line. Terminal 12 is short-circuited to ground. The five sections need not be L sections; they could be $\pi$ or T sections as well.

Let the characteristic impedance of the line between terminals 10 and 11 be $C_{c1}$ and between terminals 11 and 12 be $Z_{c2}$.

Then $$Z_{c1}=\sqrt{\frac{L_1}{C_1}} \text{ and } Z_{c2}=\sqrt{\frac{L_2}{C_2}}$$

provided, of course, that the components of the input pulses have frequencies low compared to the cut-off frequency of the delay line.

The artificial transmission line of Fig. 1 then comprises essentially a first delay line of characteristic impedance $Z_{c1}$ in series with a second delay line of characteristic impedance $Z_{c2}$ which is short-circuited at its far end.

If $Z_{c2}$ is different from $Z_{c1}$, an input pulse transmitted down the line from input terminal 10 will be partially reflected at the point of discontinuity at terminal 11 and the remainder of the pulse will continue on to terminal 12 where it is reflected in turn. The coefficient of reflection for a pulse reaching terminal 11 is $$\frac{\frac{Z_{c2}}{Z_{c1}}-1}{\frac{Z_{c2}}{Z_{c1}}+1}$$

If $Z_{c2}$ is less than $Z_{c1}$ the reflection coefficient is negative, signifying that the reflected portion of the pulse reaching terminal 11 is reversed in polarity from the incident pulse. At the short-circuited end of the line at terminal 12, the reflection coefficient is $-1$ so that whatever pulse reaches the end of the line is entirely reflected with reversed polarity. The input terminating impedance at terminal 10 is very high compared to the characteristic impedance of the line between terminals 10 and 11 between input pulses so that substantially total reflection takes place at the input end of the line.

The time of delay of a pulse in traversing a section of line is equal to the square root of the product of the inductance and capacitance for the section. Thus for a round trip of the four line sections between terminals 10 and 11, the time of delay is $8\sqrt{L_1C_1}$. Between terminals 11 and 12 there is an additional round trip delay of $2\sqrt{L_2C_2}$.

With negative reflection coefficients at both terminals 11 and 12, it will be apparent that the effect on an input pulse will be first to reverse its polarity on consecutive reflections to the input end at terminal 11; second, to broaden its base on each consecutive reflection by an amount equal to the round trip delay time between terminals 11 and 12; and third, to reduce the peak amplitude for consecutive reflections. The peak amplitude of a reflected pulse occurs when the portion reflected from terminal 12 overlaps the portion reflected from terminal 11. Therefore, the shape of reflections besides being a function of the reflection coefficients at terminals 11 and 12 is also a function of the width $\delta$ of the input pulse and the total delay time of the delay line. Also, as a practical matter, there is some resistance associated with the units making up the delay line which has the effect of attenuating the amplitudes of reflections, and the attenuation effects increase for consecutive reflections.

In an illustrative application of this invention, a first input pulse is applied to input terminal 10 of the delay line and the second reflection from terminals 11 and 12 returns to the input end with the same polarity and substantially the same amplitude as the first input pulse. The second reflection of the first input pulse is timed to coincide with a second input pulse so that the resultant amplitude is sufficient to trigger associated circuits for which the amplitude of one pulse alone is insufficient. The first and third reflections being of opposite polarity to the input pulses would cancel any input pulses with which they happened to coincide. The fourth and subsequent reflections have insufficient amplitudes to reinforce any subsequent input pulses and to bring them to a triggering level.

In terms of the width $\delta$ of input pulses applied to input terminal 10, the circuit of Fig. 1 can have the following approximate relationships in order to obtain the above results, $\delta=8\sqrt{L_1C_1}$, $L_2=\frac{1}{6}L_1$, $C_2=10C_1$, and the spacing between input pulses equal to twice the round trip delay time between input terminal 10 and the short circuited end 12 of the delay line. The reflection coefficient at terminal 11 is calculated to be −0.775.

In Fig. 2 is illustrated the actual wave form for a single input pulse and its reflections, observed at the input end of a practical line constructed as above described. The positive pulse 16 is the first input pulse and is less than ideally shaped. The negative pulse 17 is the first reflection. The positive pulse 18 is the second reflection whose shape and amplitude are substantially the same as that of input pulse 16. The delay time between peaks of input pulse 16 and second reflection 18 is equal to the predetermined time or recurrence interval between input pulse 16 and a succeeding input pulse. Thus for a series of input pulses like 16 with the proper predetermined separation time, the circuit of Fig. 1 accomplishes reinforcement of two successive input pulses to obtain an approximately double peak amplitude which is sufficient to trigger associated circuits. The third reflection 19 is again negative and the fourth reflection 20, although positive, is of greatly diminished amplitude, insufficient as are all subsequent reflections, for reinforcing input triggers with which they may coincide to a level high enough for triggering.

Although there is shown and described only a certain specific embodiment of this invention in a discontinuous delay line, the many modifications possible thereof will be readily apparent to those skilled in the art. Therefore this invention is not to be limited except insofar as is necessitated by the prior art and the spirit of the appended claims.

What is claimed is:

1. An artificial transmission line adapted to receive input pulses comprising, a first delay line having a delay time substantially equal to the width of said input pulses, a second delay line having a delay time substantially one-third said delay time of said first delay line, and means coupling said first and second delay lines to produce a reflection coefficient of substantially −0.775 therebetween, said second line being short circuited at its end remote from said first line to produce thereat a reflection coefficient of −1, whereby the second reflection of each of said input pulses is of the same polarity and substantially the same amplitude as each of said input pulses, and all subsequent reflections of the same polarity are substantially suppressed.

2. An artificial transmission line adapted to receive a series of input pulses of predetermined width and recurrence interval comprising, four L sections of artificial transmission line connected in series, each of said four sections having a delay time substantially one-fourth said width of said input pulses, and a fifth L section coupled in series with said four L sections, said fifth section having a delay time substantially one-third said width of said input pulses, said fifth section being short-circuited at its end remote from said four sections to produce thereat a reflection coefficient of −1, said four sections and said fifth section having different characteristic impedances such as to produce a reflection coefficient of −0.775 between them, said total delay time of all of said L sections being equal to one-fourth said predetermined recurrence interval of said input pulses, whereby the second reflection of each of said input pulses reinforces the next succeeding input pulse which is of the same polarity, each said second reflection being substantially the same amplitude as each of said input pulses, and all subsequent reflections of the same polarity being substantially suppressed.

3. A delay line circuit in which successive reflections of like polarity have unequal amplitudes comprising, a first delay line having first and second ends, said first delay line being adapted to receive input pulses at said first end, the input terminating impedance at said first end in the interval between pulses being substantially an open circuit, a second delay line having first and second ends, said second delay line being coupled at its first end to said second end of said first delay line as a terminating impedance of said first delay line, said second delay line having a characteristic impedance different from that of said first delay line, said second delay line being terminated at its second end in a short circuit.

4. A delay line circuit in which successive reflections of like polarity have unequal amplitudes comprising, a first delay line having first and second ends, said first delay line being adapted to receive input pulses at said first end, the input terminating impedance at said first end in the interval between pulses being substantially an open circuit, a second delay line having first and second ends, said second delay line being coupled at its first end to said second end of said first delay line as a terminating impedance of said first delay line, said second delay line having a characteristic impedance and delay time different from the characteristic impedance and delay time of said first delay line, said second delay line being terminated at its second end in a short circuit.

5. A delay line circuit in which successive reflections of like polarity have unequal amplitudes comprising a first delay line having first and second ends, said first delay line being adapted to receive input pulses of predetermined width at said first end, the input terminating impedance at said first end in the interval between pulses being substantially an open circuit, the delay time of said first delay line being related to the time width of said input pulses by a simple fraction, the value of unity being considered as a fraction, a second delay line having first and second ends, said second delay line being coupled at its first end to said second end of said first delay line as a terminating impedance of said first delay line, said second delay line having a delay time shorter than the delay time of said first delay line, the delay time of said second delay line being related to the time width of said input pulses by a simple fraction, said second delay line having a characteristic impedance differing by a substantial amount from the characteristic impedance of said first delay line, said second delay line being terminated at its second end in a short circuit.

6. A delay line circuit as in claim 5 wherein said second delay line has a characteristic impedance which is lower than the characteristic impedance of said first delay line.

References Cited in the file of this patent

UNITED STATES PATENTS

| | | |
|---|---|---|
| 2,255,839 | Wilson | Sept. 16, 1941 |
| 2,266,154 | Blumlein | Dec. 16, 1941 |
| 2,420,302 | Darlington | May 13, 1947 |
| 2,420,309 | Goodall | May 13, 1947 |